US012731726B2

(12) United States Patent
Eda et al.

(10) Patent No.: US 12,731,726 B2
(45) Date of Patent: Sep. 8, 2026

(54) COIL COMPONENT

(71) Applicant: TDK CORPORATION, Tokyo (JP)

(72) Inventors: Hokuto Eda, Tokyo (JP); Hitoshi Ohkubo, Tokyo (JP); Masazumi Arata, Tokyo (JP); Masataro Saito, Tokyo (JP); Kohei Takahashi, Tokyo (JP); Takamasa Iwasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 1048 days.

(21) Appl. No.: 17/829,513

(22) Filed: Jun. 1, 2022

(65) Prior Publication Data

US 2022/0392698 A1 Dec. 8, 2022

(30) Foreign Application Priority Data

Jun. 4, 2021 (JP) ................................ 2021-094523

(51) Int. Cl.
*H01F 5/00* (2006.01)
*H01F 27/255* (2006.01)
*H01F 27/29* (2006.01)
*H01F 27/32* (2006.01)

(52) U.S. Cl.
CPC ......... *H01F 27/324* (2013.01); *H01F 27/255* (2013.01); *H01F 27/292* (2013.01)

(58) Field of Classification Search
CPC .................................................... H01F 27/292
USPC ......................................................... 336/200
See application file for complete search history.

(56) References Cited

U.S. PATENT DOCUMENTS

2005/0286205 A1 12/2005 Togashi et al.
2017/0032882 A1* 2/2017 Yang .................. H01F 27/2804
2017/0148561 A1* 5/2017 Yoon ...................... H05K 1/181
2020/0373079 A1* 11/2020 Yoshioka .............. H01F 27/327
2021/0166858 A1 6/2021 Saito et al.

FOREIGN PATENT DOCUMENTS

JP 2006-013383 A 1/2006
JP 2015-130472 A 7/2015

* cited by examiner

*Primary Examiner* — Ronald Hinson
(74) *Attorney, Agent, or Firm* — Oliff PLC

(57) ABSTRACT

A coil component improving insulation between external terminals provided on the same surface of an element body is provided. In the coil component, when a voltage is applied via the external terminal electrode, for example, a potential difference may occur between the outer end portions. In the coil component, since the insulation between the outer end portions is enhanced by the upper insulator exposed on the end face of the element body, even when a potential difference occurs between the outer end portions, a situation in which the outer end portions are short-circuited on the end face is prevented.

5 Claims, 10 Drawing Sheets

COIL COMPONENT

CROSS-REFERENCE TO RELATED APPLICATIONS

This application is based upon and claims the benefit of priority from Japanese Patent Application No. 2021-94523, filed on 4 Jun. 2021, the entire contents of which are incorporated herein by reference.

TECHNICAL FIELD

The present disclosure relates to a coil component.

BACKGROUND

Known in the art is a coil component in which a plurality of coils is provided in an element body. Japanese Unexamined Patent Application No. 2015-130472 discloses a coil component having four terminals in which two coils are provided in an element body.

SUMMARY

In the coil component as described above, a plurality of external terminals may be provided on the same surface of the element body, and it is necessary to achieve sufficient insulation between the external terminals.

The inventors have made extensive studies on insulation between the external terminals and have newly found a technique capable of further improving insulation between the external terminals.

According to an aspect of the present disclosure, a coil component improving insulation between external terminals provided on the same surface of an element body is provided.

A coil component according to one aspect of the present disclosure includes an element body made of a metal magnetic powder-containing resin and having a first end face and a second end face parallel to each other, an insulating substrate provided in the element body, the insulating substrate extending orthogonal to the first end face and the second end face between the first end face and the second end face, a pair of coil portions provided on the insulating substrate and each having a first end portion exposed to the first end face, a pair of first external terminals provided on the first end face and connected to first end portions of the pair of coil portions, respectively, and a first insulating portion exposed from the inside of the element body to the first end face, the first insulating portion located between the first end portions of the pair of coil portions on the first end face.

In the above coil component, the first insulating portion exposed at the first end face of the element body prevents the first end portions of the pair of coil portions from being short-circuited on the first end face.

In the coil component according to another aspect of the present disclosure, the first insulating portion is provided in an entire region sandwiched between the first end portions of the pair of coil portions on the first end face.

In the coil component according to another aspect of the present disclosure, the first insulating portion and the metal magnetic powder-containing resin are exposed in a region sandwiched between the first end portions of the pair of coil portions on the first end face, and wherein the first insulating portion is sandwiched between the metal magnetic powder-containing resins in a direction where the first end portions of the pair of coil portions are arranged.

In the coil component according to another aspect of the present disclosure, the first insulating portion extends to cross between the first end portions of the pair of coil portions.

In the coil component according to another aspect of the present disclosure, the coil component further includes an insulating layer covering at least a part of a region sandwiched between the first end portions of the pair of coil portions on the first end face.

In the coil component according to another aspect of the present disclosure, the first external terminal directly covers a portion of the first insulating portion on the first end face.

In the coil component according to another aspect of the present disclosure, each of the pair of coil portions has a second end portion exposed to the second end face, and the coil component further includes a pair of second external terminals provided on the second end face and connected to second end portions of the pair of coil portions, respectively, a second insulating portion exposed from the inside of the element body to the second end face and located between the second end portions of the pair of coil portions on the second end face.

DETAILED DESCRIPTION

Figure 1:
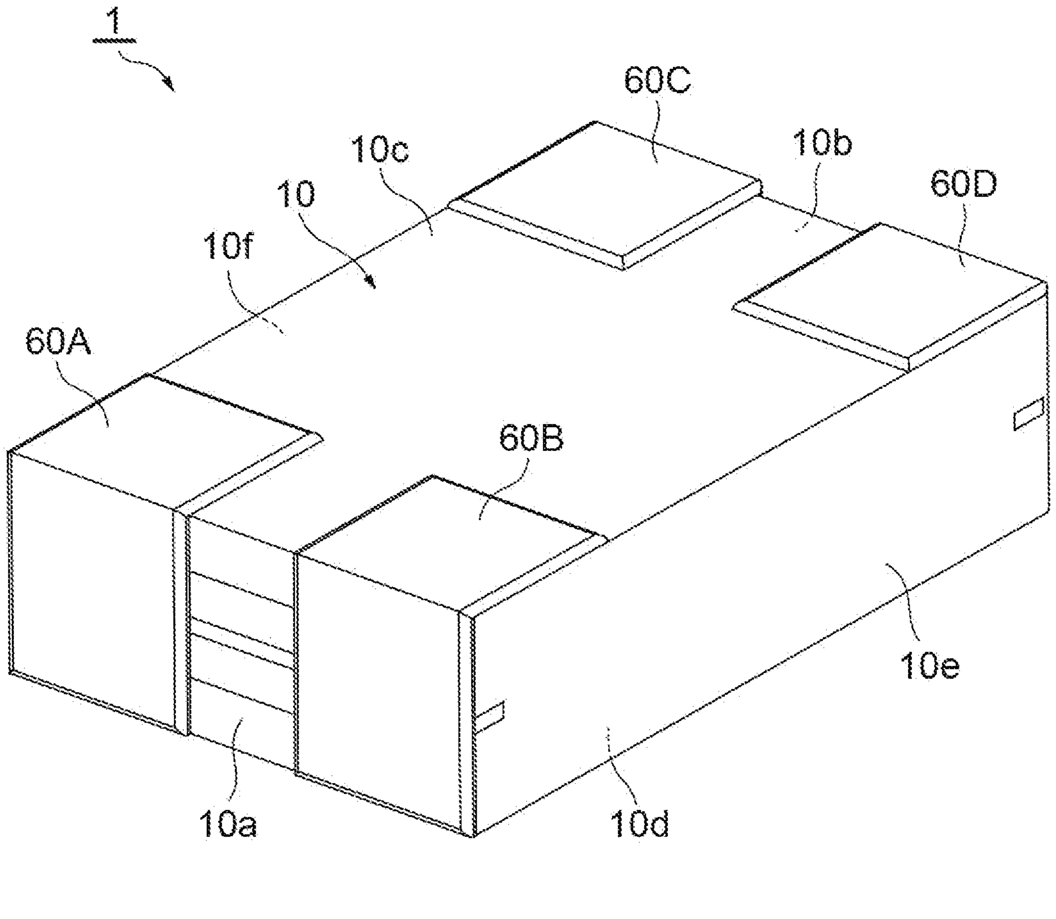
FIG. 1 is a schematic perspective view of the coil component according to one embodiment.

Hereinafter, embodiments of the present disclosure will be described in detail with reference to the accompanying drawings. In the description, the same reference numerals are used for the same elements or elements having the same functions, and redundant description will be omitted.

The coil component 1 according to one embodiment is a balun coil. The balun coil is used, for example, when a near field communication circuit (NFC circuit) is mounted on a cellular terminal. The balun coil performs conversion between an unbalanced signal of the antenna and a balanced signal of the NFC circuit, thereby realizing connection between the unbalanced circuit and the balanced circuit.

As shown in FIG. 1, the coil component 1 includes an element body 10, a coil structure 20 embedded in the element body 10, and two pairs of external terminal electrodes 60A, 60B, 60C, and 60D provided on the element body 10.

The element body 10 has a rectangular parallelepiped outer shape and has six faces 10*a* to 10*f*. As an example, the element body 10 is designed to have dimensions of long side 2.0 mm, short side 1.25 mm, and height 0.65 mm Among the faces 10*a* to 10*f* of the element body 10, the end face 10*a* (first end face) and the end face 10*b* (second end face) are parallel to each other, the upper surface 10*c* and the lower surface 10*d* are parallel to each other, and the side face 10*e* and the side face 10*f* are parallel to each other. The upper surface 10*c* of the element body 10 is a surface facing in parallel to a mounting surface of a mounting substrate on which the coil component 1 is mounted.

The element body 10 is made of a metal magnetic powder-containing resin 12 which is one type of magnetic material. The magnetic metal powder-containing resin 12 is a bound powder where magnetic metal powder is bound by a binder resin. The metal magnetic powder of the metal magnetic powder-containing resin 12 is composed of, for example, an iron-nickel alloy (permalloy alloy), carbonyl iron, an amorphous, FeSiCr alloy in amorphous or crystalline state, sendust, or the like. The binder resin is, for example, a thermosetting epoxy resin. In the present embodiment, the content of the metallic magnetic powder in the bound powder is 80 to 92 vol % in terms of volume percent, and 95 to 99 wt % in terms of weight percent. From the viewpoint of magnetic properties, the content of the metallic magnetic powder in the bound powder may be 85 to 92 vol % in terms of volume percent and 97 to 99 wt % in terms of weight percent. The magnetic powder of the metal magnetic powder-containing resin 12 may be a powder having one type of average particle diameter or may be a mixed powder having a plurality of types of average particle diameters.

The magnetic metal powder-containing resin 12 of the element body 10 integrally covers a coil structure 20 described later. Specifically, the magnetic metal powder-containing resin 12 covers the coil structure 20 from above and below and covers the outer periphery of the coil structure 20. The magnetic metal powder-containing resin 12 fills the inner peripheral region of the coil structure 20.

The coil structure 20 includes an insulating substrate 30, an upper coil structure 40A provided on an upper side of the insulating substrate 30, and a lower coil structure 40B provided on a lower side of the insulating substrate 30.

Figure 3:
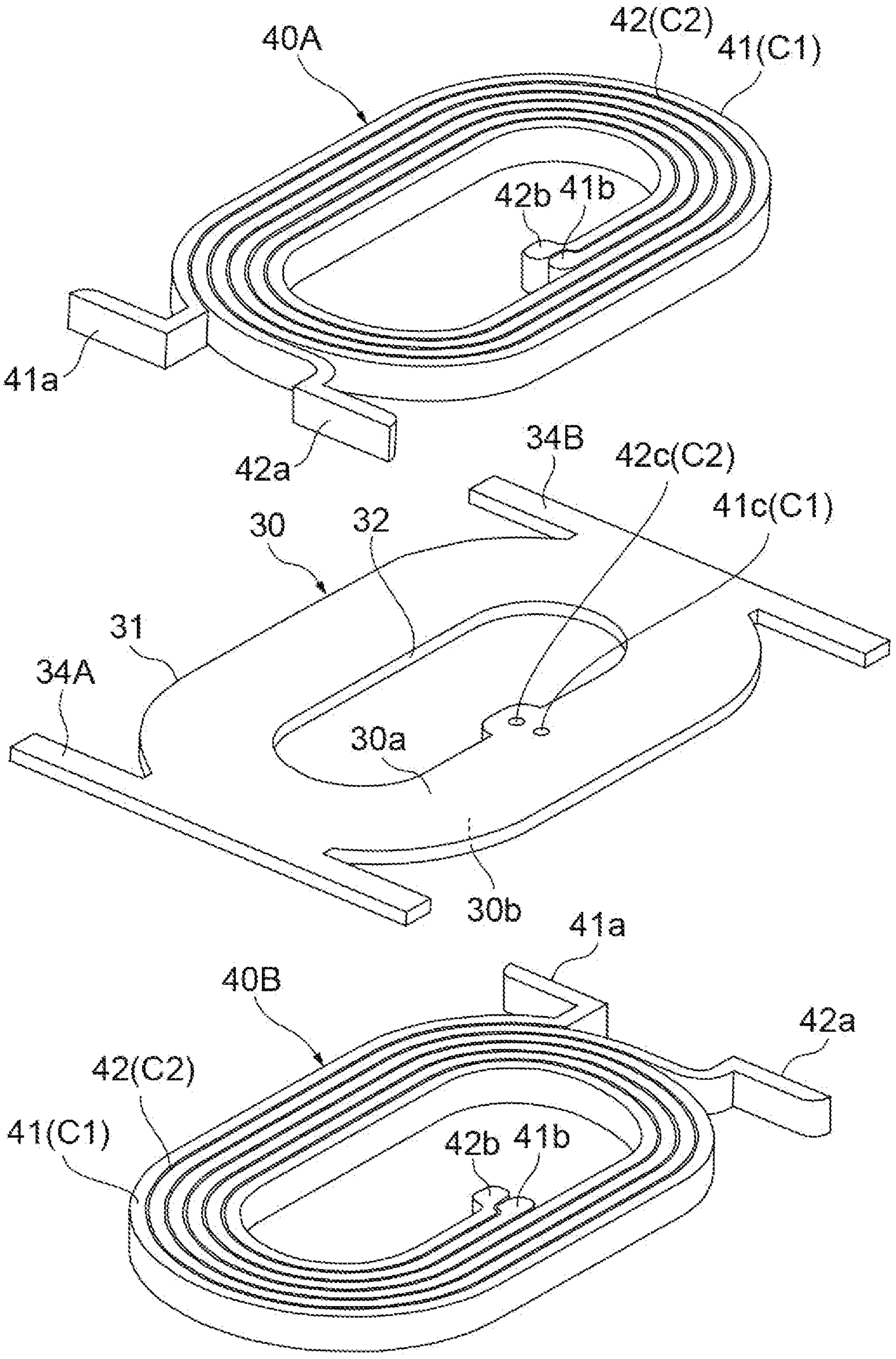
FIG. 3 is an exploded view of the coil shown in FIG. 2.

The insulating substrate 30 has a flat plate shape, extends between the end faces 10*a* and 10*b* of the element body 10, and is designed to be orthogonal to the end faces 10*a* and 10*b*. The insulating substrate 30 extends in parallel to the upper surface 10*c* and the lower surface 10*d* of the element body 10. As shown in FIG. 3, the insulating substrate 30 includes an elliptical ring-shaped coil forming portion 31 extending along the long-side direction of the element body 10, and a pair of frame portions 34A and 34B extending along the short-side direction of the element body 10 and sandwiching the coil forming portion 31 from both sides. An elliptical opening 32 extending along the long-side direction of the element body 10 is provided in a central portion of the coil forming portion 31.

The insulating substrate 30 is made of a nonmagnetic insulating material. The thickness of the insulating substrate 30 may be designed in a range of 10 to 60 μm, for example. In the present embodiment, the insulating substrate 30 has a configuration in which glass cloth is impregnated with epoxy resin. The resin constituting the insulating substrate 30 is not limited to the epoxy-based resin and may be a BT resin, polyimide, aramid, or the like. The insulating substrate 30 may be made of ceramic or glass. The constituent material of the insulating substrate 30 may be a mass-produced printed circuit board material. The insulating substrate 30 may be made of a plastic material used for a BT printed circuit board, an FR4 printed circuit board, or an FR5 printed circuit board.

Figure 2:
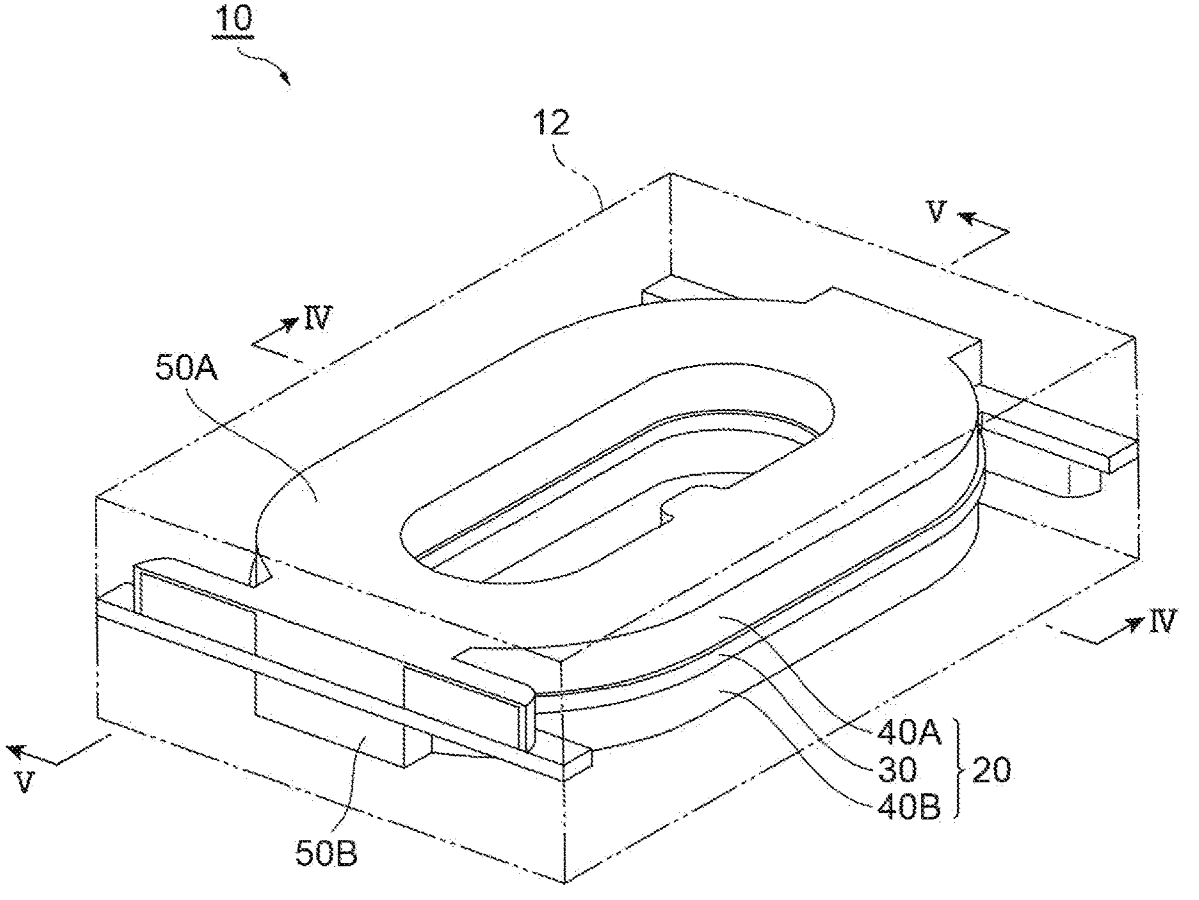
FIG. 2 shows the inside of the coil component of FIG. 1.

The upper coil structure 40A is provided on the upper surface 30*a* of the coil forming portion 31 of the insulating substrate 30. As shown in FIGS. 2 and 3, the upper coil structure 40A includes a first planar coil 41, a second planar coil 42, and an upper insulator 50A. The first planar coil 41 and the second planar coil 42 are wound adjacent to each other in parallel on the upper surface 30*a* of the insulating substrate 30.

The first planar coil 41 is a substantially oval spiral air-core coil wound around the opening 32 of the coil forming portion 31 in the same layer on the upper surface 30*a* of the insulating substrate 30. The number of turns of the first planar coil 41 may be one or more turns. In the present embodiment, the number of turns of the first planar coil 41 is three to four. The first planar coil 41 has an outer end portion 41*a* and an inner end portion 41*b*. The outer end portion 41*a* is provided on the frame portion 34A and is exposed from the end face 10*a* of the element body 10. The inner end portion 41*b* is provided at an edge of the opening 32. The insulating substrate 30 is provided with a first through conductor 41*c* extending in the thickness direction of the insulating substrate 30 at a position overlapping the inner end 41*b* of the first planar coil 41. The first planar coil 41 is made of Cu, for example, and can be formed by electrolytic plating.

Similarly to the first planar coil 41, the second planar coil 42 is a substantially elliptical spiral air-core coil wound around the opening 32 of the coil forming portion 31 in the same layer on the upper surface 30*a* of the insulating substrate 30. The second planar coil 42 is wound so as to be adjacent to the first planar coil 41 on the inner peripheral side of the first planar coil 41. The number of turns of the second planar coil 42 may be one or more turns. In the present embodiment, the number of turns of the second planar coil 42 is the same as the number of turns of the first planar coil 41. The second planar coil 42 has an outer end portion 42*a* and an inner end portion 42*b*. Similarly to the outer end portion 41*a* of the first planar coil 41, the outer end portion 42*a* of the second planar coil 42 is provided on the frame portion 34A and is exposed from the end face 10*a* of the element body 10. The inner end portion 42*b* of the second planar coil 42 is provided at the edge of the opening 32 and is adjacent to the inner end portion 41*b* of the first planar coil 41. The insulating substrate 30 is provided with a second through conductor 42*c* extending in the thickness direction of the insulating substrate 30 at a position overlapping with the inner end portion 42*b* of the second planar coil 42. Like the first planar coil 41, the second planar coil 42 is made of Cu, for example, and can be formed by electrolytic plating.

Figure 4:
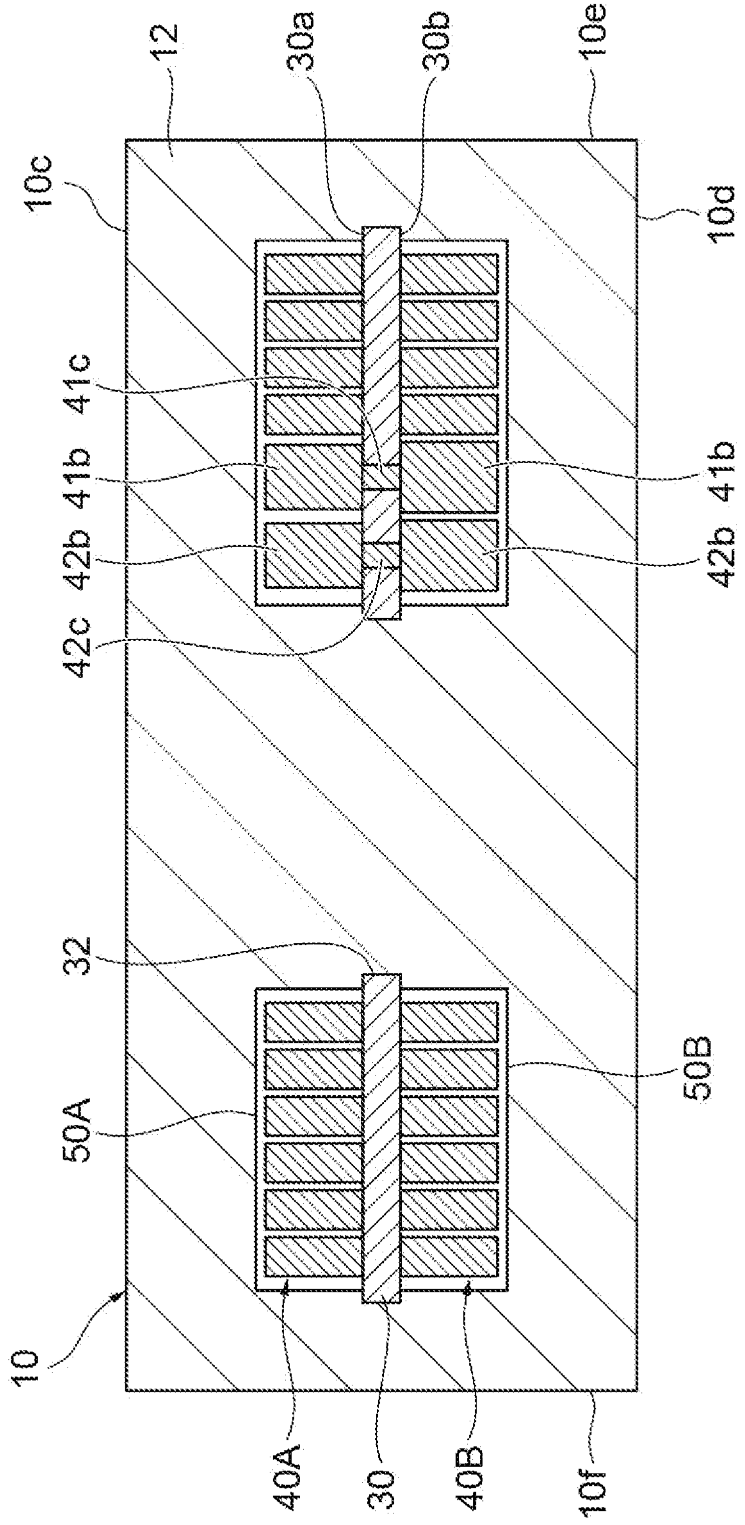
FIG. 4 is a cross-sectional view taken along line IV-IV of the coil component shown in FIG. 2.
Figure 5:
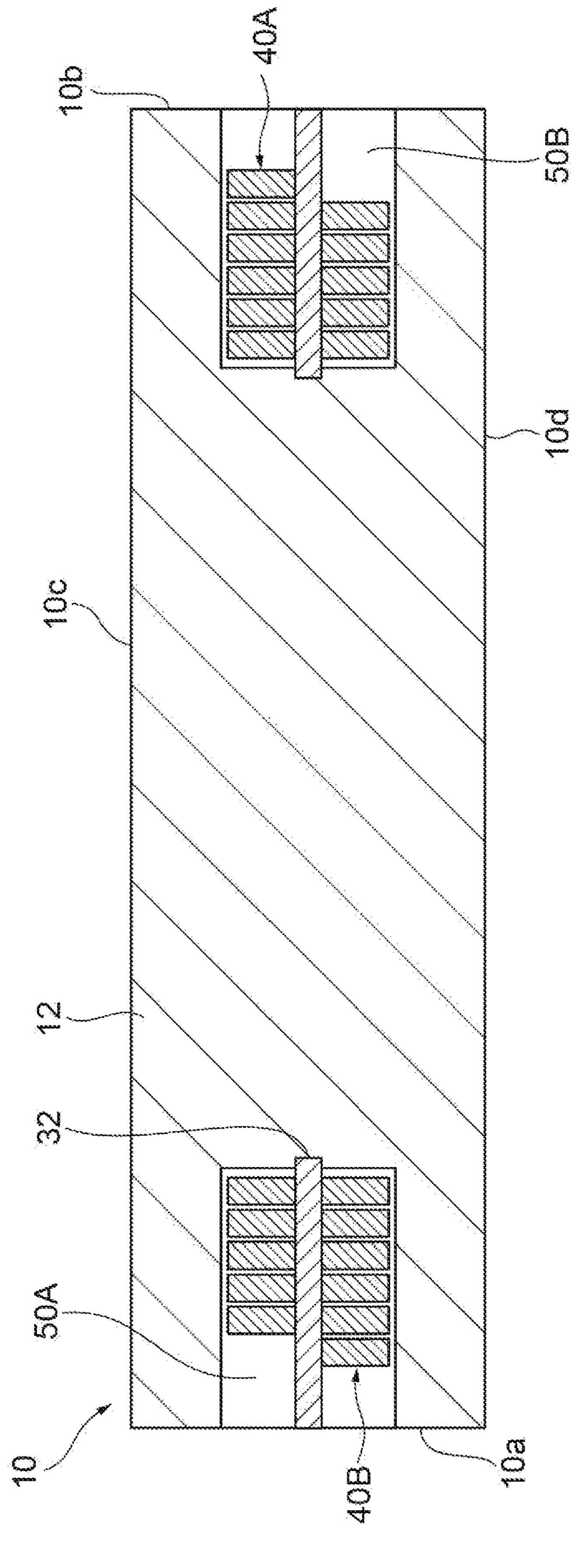
FIG. 5 is a cross-sectional view taken along line V-V of the coil component shown in FIG. 2.
Figure 6:
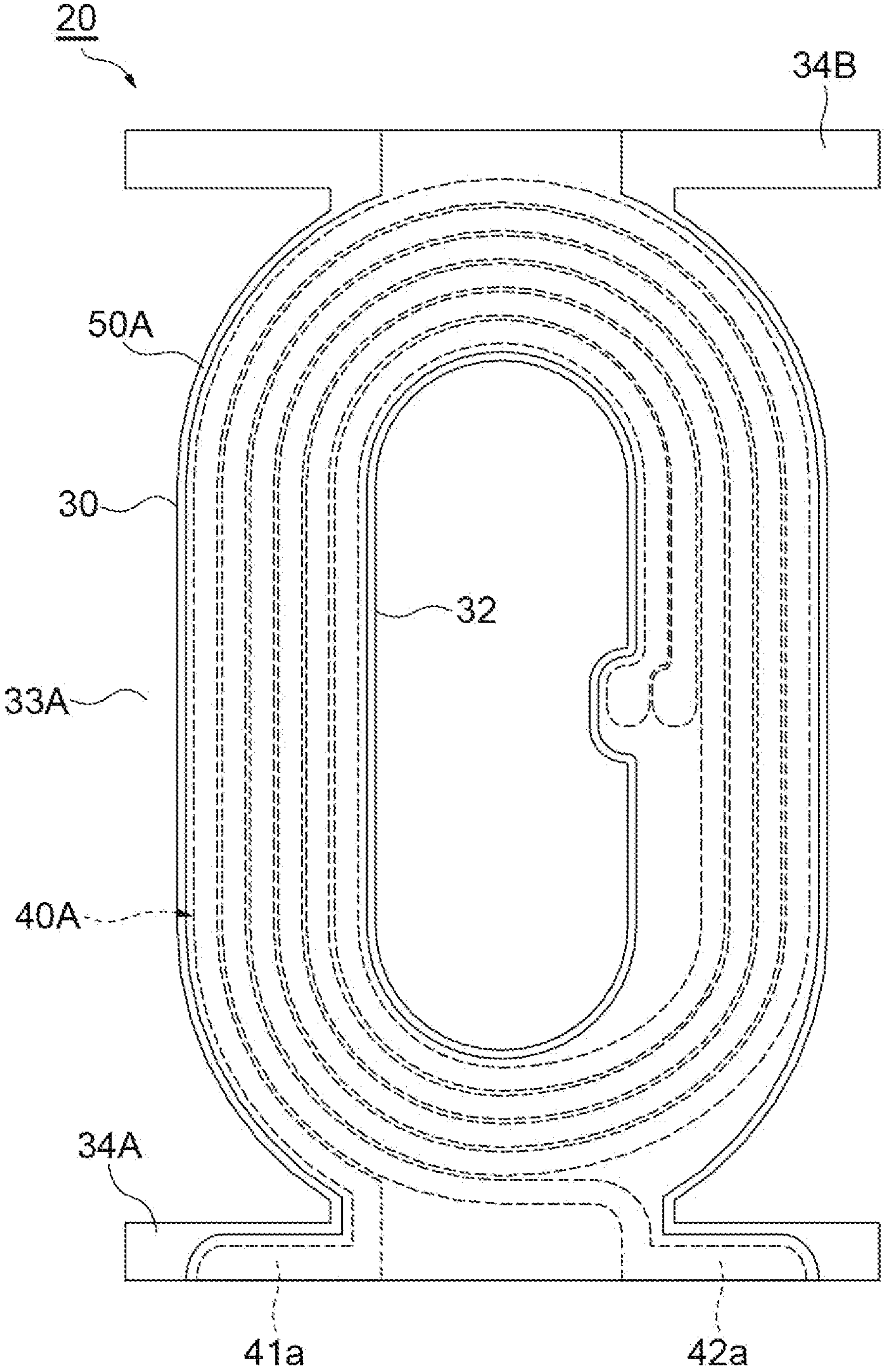
FIG. 6 is a plan view of the coil shown in FIG. 2.

The upper insulator 50A (first insulating portion) is provided on the upper surface 30*a* of the insulating substrate 30 and is a thick-film resist patterned by known photolithography. The upper insulator 50A defines a plating growth region of the first planar coil 41 and the second planar coil 42. In the present embodiment, as shown in FIG. 4, the upper insulator 50A integrally covers the first planar coil 41 and the second planar coil 42, and more specifically, covers side surfaces and upper surfaces of the first planar coil 41 and the second planar coil 42. As shown in FIGS. 5 and 6, a portion of the upper insulator 50A extends from the inside of the element body 10 to the end face 10*a* of the element body 10 through between the outer end portion 41*a* and the outer end portion 42*a*, and is exposed at the end face 10*a*. Further, as shown in FIGS. 5 and 6, a part of the upper insulator 50A extends from the inside of the element body 10 to the end surface 10*b* along the substrate upper face 30*a* and is exposed at the end face 10*b*. The upper insulator 50A is thicker than the first planar coil 41 and the second planar coil 42. The upper insulator 50A is made of, for example, epoxy.

The lower coil structure 40B is provided on the substrate lower surface 30*b* of the coil forming portion 31 of the insulating substrate 30. As shown in FIGS. 2 and 3, the lower coil structure 40B includes a first planar coil 41, a second planar coil 42, and a lower insulator 50B. The first planar coil 41 and the second planar coil 42 are wound in parallel and adjacent to each other on the lower surface 30*b* of the insulating substrate 30.

The first planar coil 41 and the second planar coil 42 of the lower coil structure 40B are symmetrical to the first planar coil 41 and the second planar coil 42 of the upper coil structure 40A. To be more specific, the first planar coil 41 and the second planar coil 42 of the lower coil structure 40B have shapes obtained by inverting the first planar coil 41 and the second planar coil 42 of the upper coil structure 40A around axes parallel to the short sides of the element body 10.

The outer end portion 41*a* of the first planar coil 41 of the lower coil structure 40B is provided on the frame portion 34B and is exposed from the end face 10*b* of the element body 10. The inner end portion 41*b* of the first planar coil 41 of the lower coil structure 40B overlaps the first through conductor 41*c* provided in the insulating substrate 30. Therefore, the inner end portion 41*b* of the first planar coil 41 of the lower coil structure 40B is electrically connected to the inner end portion 41*b* of the first planar coil 41 of the upper coil structure 40A via the first through conductor 41*c*. The first planar coil 41 of the lower coil structure 40B is made of Cu, for example, and can be formed by electrolytic plating.

The outer end portion 42*a* of the second planar coil 42 of the lower coil structure 40B is provided on the frame portion 34B and is exposed from the end face 10*b* of the element body 10. The inner end portion 42*b* of the second planar coil 42 of the lower coil structure 40B overlaps the second through conductor 42*c* provided in the insulating substrate 30. Therefore, the inner end portion 42*b* of the second planar coil 42 of the lower coil structure 40B is electrically connected to the inner end portion 42*b* of the second planar coil 42 of the upper coil structure 40A via the second through conductor 42*c*. The second planar coil 42 of the lower coil structure 40B is made of, for example, Cu, and can be formed by electrolytic plating.

The lower insulator 50B (second insulating portion) is provided on the lower surface 30*b* of the insulating substrate 30 and is a thick-film resist patterned by known photolithography. Like the upper insulator 50A, the lower insulator 50B defines a plating growth region for the first planar coil 41 and the second planar coil 42. In the present embodiment, as shown in FIG. 4, the lower insulator 50B integrally covers the first planar coil 41 and the second planar coil 42, and more specifically, covers side surfaces and upper surfaces of the first planar coil 41 and the second planar coil 42. Similarly to the upper insulator 50A, a portion of the lower insulator 50B extends from the inside of the element body 10 to the end face 10*b* of the element body 10 through between the outer end portion 41*a* and the outer end portion 42*a*, and is exposed at the end face 10*b*. A portion of the lower insulator 50B extends along the substrate lower surface 30*b* from the inside of the element body 10 to the end face 10*a* and is exposed at the end face 10*a*. The lower insulator 50B is thicker than the first planar coil 41 and the second planar coil 42. The lower insulator 50B may have the same thickness as the upper insulator 50A. The lower insulator 50B is made of, for example, epoxy.

The element body 10 includes a pair of coil portions C1 and C2 constituting a double coil structure. The first coil portion C1 includes the first planar coil 41 of the upper coil structure 40A provided on the upper surface 30*a* of the insulating substrate 30, the first planar coil 41 of the lower coil structure 40B provided on the lower surface 30*b* of the insulating substrate 30, and the first through conductor 41*c* connecting the first planar coils 41 on both surfaces. In the first coil portion C1, the outer end portion 41*a* of the first planar coil 41 of the upper coil structure 40A constitutes a first end portion, and the outer end portion 41*a* of the first planar coil 41 of the lower coil structure 40B constitutes a second end portion. The second coil portion C2 is constituted by the second planar coil 42 of the upper coil structure 40A provided on the upper surface 30*a* of the insulating substrate 30, the second planar coil 42 of the lower coil structure 40B provided on the lower surface 30*b* of the insulating substrate 30, and the second through conductor 42*c* connecting the second planar coils 42 on both surfaces. In the second coil portion C2, the outer end portion 42*a* of the second planar coil 42 of the upper coil structure 40A constitutes a first end portion, and the outer end portion 42*a* of the second planar coil 42 of the lower coil structure 40B constitutes a second end portion.

The two pairs of external terminal electrodes 60A, 60B, 60C, and 60D are provided in pairs on end faces 10*a* and 10*b* of the element body 10 that are parallel to each other.

Of the pair of external terminal electrodes 60A and 60B (first external terminals) provided on the end face 10*a*, the external terminal electrode 60A is connected to the outer end portion 41*a* of the first planar coil 41 of the upper coil structure 40A, and the external terminal electrode 60B is connected to the outer end portion 42*a* of the second planar coil 42 of the upper coil structure 40A. As shown in FIG. 6, when viewed from the end face 10*a* side, the external terminal electrode 60A is biased toward the side face 10*f* side, and covers the end face 10*a* up to the vicinity of the side face 10*f*. The external terminal electrode 60B is biased to the side face 10*e* side, and covers the end face 10*a* up to the vicinity of the side face 10*e*. When viewed from the end face 10*a* side, the external terminal electrode 60A and the external terminal electrode 60B are separated by a predetermined uniform width.

Of the pair of external terminal electrodes 60C and 60D (second external terminals) provided on the end face 10*b*, the external terminal electrode 60C is connected to the outer end portion 41*a* of the first planar coil 41 of the lower coil structure 40B, and the external terminal electrode 60D is connected to the outer end portion 42*a* of the second planar coil 42 of the lower coil structure 40B. The external terminal electrode 60C is biased to the side face 10*f* side and covers the end face 10*b* up to the vicinity of the side face 10*f*. The external terminal electrode 60D is biased to the side face 10*e* side, and covers the end face 10*b* up to the vicinity of the side face 10*e*. When viewed from the end face 10*b* side, the external terminal electrode 60C and the external terminal electrode 60D are separated by a predetermined uniform width.

The external terminal electrode 60A on the end face 10*a* and the external terminal electrode 60C on the end face 10*b* are provided at positions corresponding to each other in the long-side direction of the element body 10. Similarly, the external terminal electrode 60B on the end face 10*a* and the external terminal electrode 60D on the end face 10*b* are provided at positions corresponding to each other in the long-side direction of the element body 10.

Each of the external terminal electrodes 60A, 60B, 60C, and 60D is bent in an L shape and continuously covers the end faces 10*a* and 10*b* and the upper surface 10*c*. In the present embodiment, the external terminal electrodes 60A, 60B, 60C, and 60D are made of resinous electrodes, for example, made of resins containing Ag powder.

Figure 7:
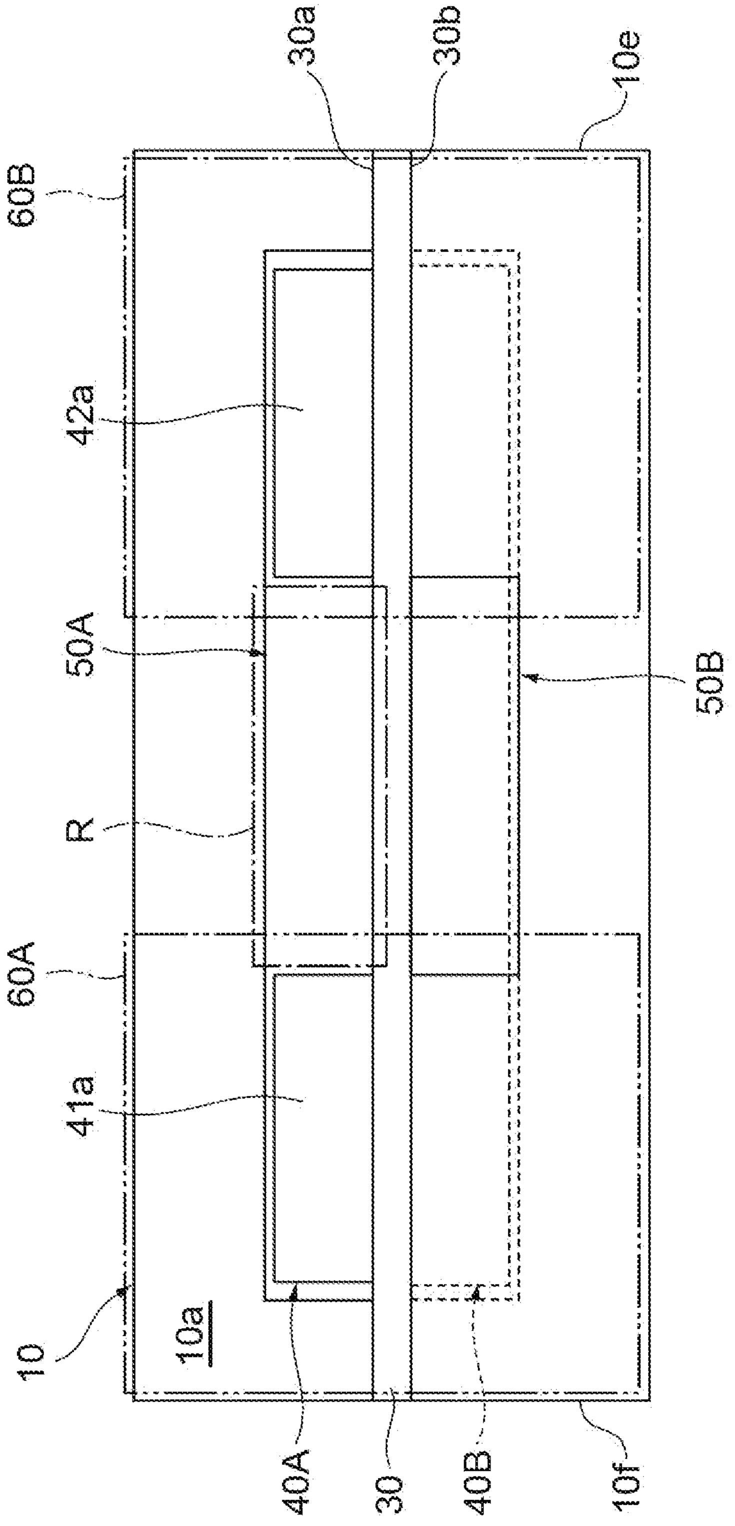
FIG. 7 shows one end face of the element body of the coil component shown in FIG. 1.

Next, the configuration at the end face 10*a* of the element body 10 will be described with reference to FIG. 7.

On the end face 10*a* of the element body 10, the outer end portion 41*a* of the first planar coil 41 and the outer end portion 42*a* of the second planar coil 42 are arranged on the upper surface 30*a* of the insulating substrate 30. The upper insulator 50A is located in a region R between the outer end 41*a* of the first planar coil 41 and the outer end portion 42*a* of the second planar coil 42 on the end surface 10*a* of the element body 10. In the present embodiment, the upper insulator 50A is present over the entire region R and extends so as to cross between the outer end portions 41*a* and 42*a* on the end surface 10*a* of the element body 10. The lower insulator 50B is located on the end surface 10*a* of the element body 10 so as to face the upper insulator 50A with the insulating substrate 30 interposed therebetween.

In the coil component 1, when a voltage is applied via the external terminal electrodes 60A, 60B, 60C, and 60D, a potential difference may be generated between the outer end portions 41*a* and 42*a*, for example. In the coil component 1, since the insulation between the outer end portions 41*a* and 42*a* is enhanced by the upper insulator 50A exposed on the end face 10*a* of the element body 10, even when a potential difference is generated between the outer end portion 41*a* and 42*a*, a situation in which the outer end portions 41*a* and 42*a* are short-circuited on the end face 10*a* is prevented. In the present embodiment, the insulation between the outer end portions 41*a* and 42*a* is further enhanced by the lower insulator 50B exposed on the end surface 10*a* of the element body 10, and a situation in which the outer end portions 41*a* and 42*a* are short-circuited on the end surface 10*a* is further prevented.

Figure 8:
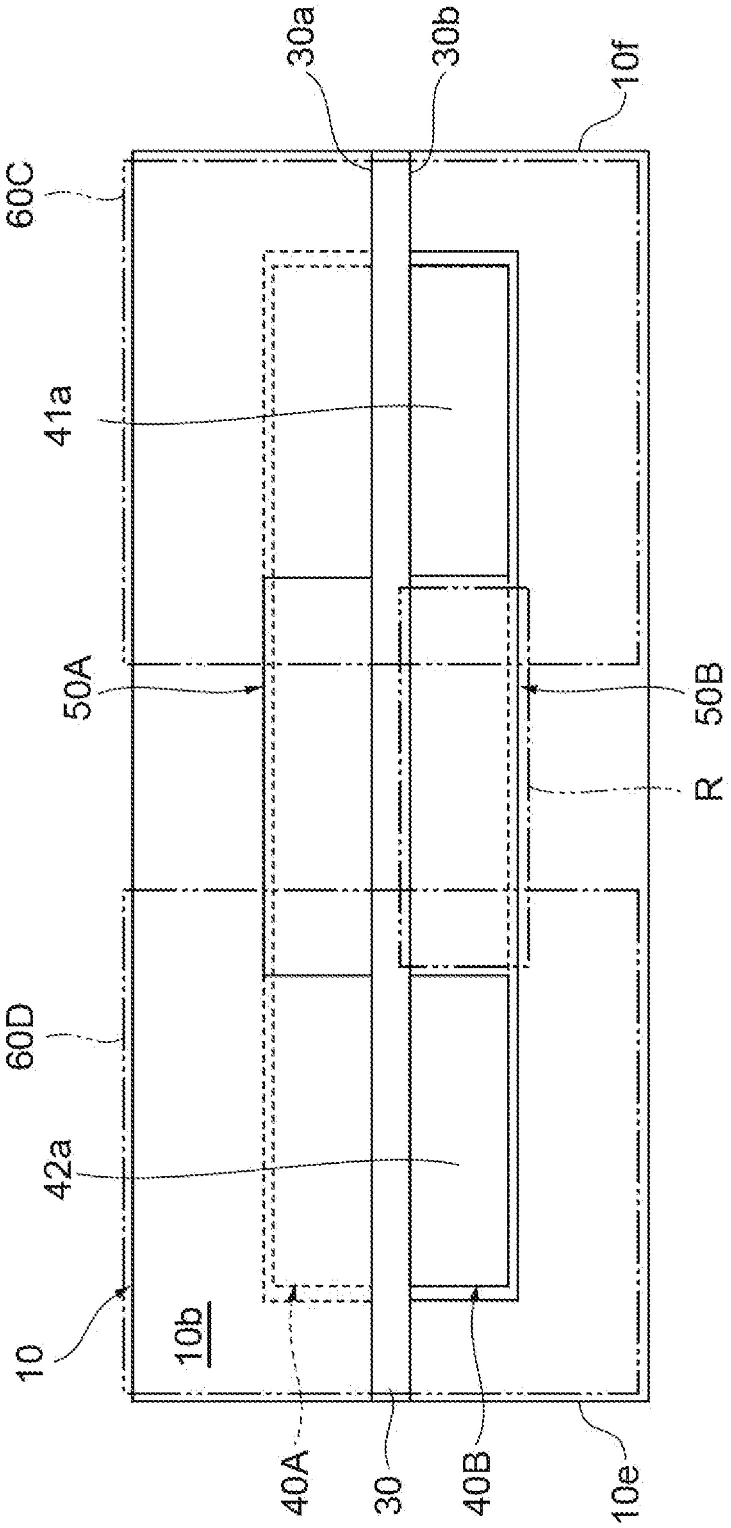
FIG. 8 shows the other end face of the element body of the coil component shown in FIG. 1.

Similarly, in the end face 10*b* of the element body 10, as shown in FIG. 8, the lower insulator 50B exposed to the end face 10*b* is located in a region R between the outer end portion 41*a* of the first planar coil 41 and the outer end portion 42*a* of the second planar coil 42. Since the insulation between the outer end portions 41*a* and 42*a* is enhanced by the lower insulator 50B, even when a potential difference is generated between the outer end portions 41*a* and 42*a*, a situation in which the outer end portions 41*a* and 42*a* are short-circuited on the end face 10*b* is prevented. In the present embodiment, the insulation between the outer end portions 41*a* and 42*a* is further enhanced by the upper insulator 50A exposed on the end surface 10*b* of the element body 10, and a situation in which the outer end portions 41*a* and 42*a* are short-circuited on the end surface 10*b* is further prevented.

In the present embodiment, the external terminal electrode 60A directly covers a portion of the upper insulator 50A exposed in the region R (more specifically, a portion on the outer end portion 41*a* side), and the external terminal electrode 60B directly covers a portion of the upper insulator 50A exposed in the region R (more specifically, a portion on the outer end portion 42*a* side). In this manner, since the external terminal electrodes 60A and 60B cover a part of the upper insulator 50A, contact areas between the external terminal electrodes 60A and 60B and the element body 10 can be reduced, and even when a potential difference occurs between the outer end portions 41*a* and 42*a*, a chance of short-circuiting can be reduced.

The upper insulator 50A and the lower insulator 50B do not necessarily need to be present over the entire region R and may be present in a part of the region R. In this case, the external terminal electrodes 60A, 60B, 60C, and 60D may cover a part of the upper insulator 50A and the lower insulator 50B, or may not cover the upper insulator 50A and the lower insulator 50B at all.

Figure 9:
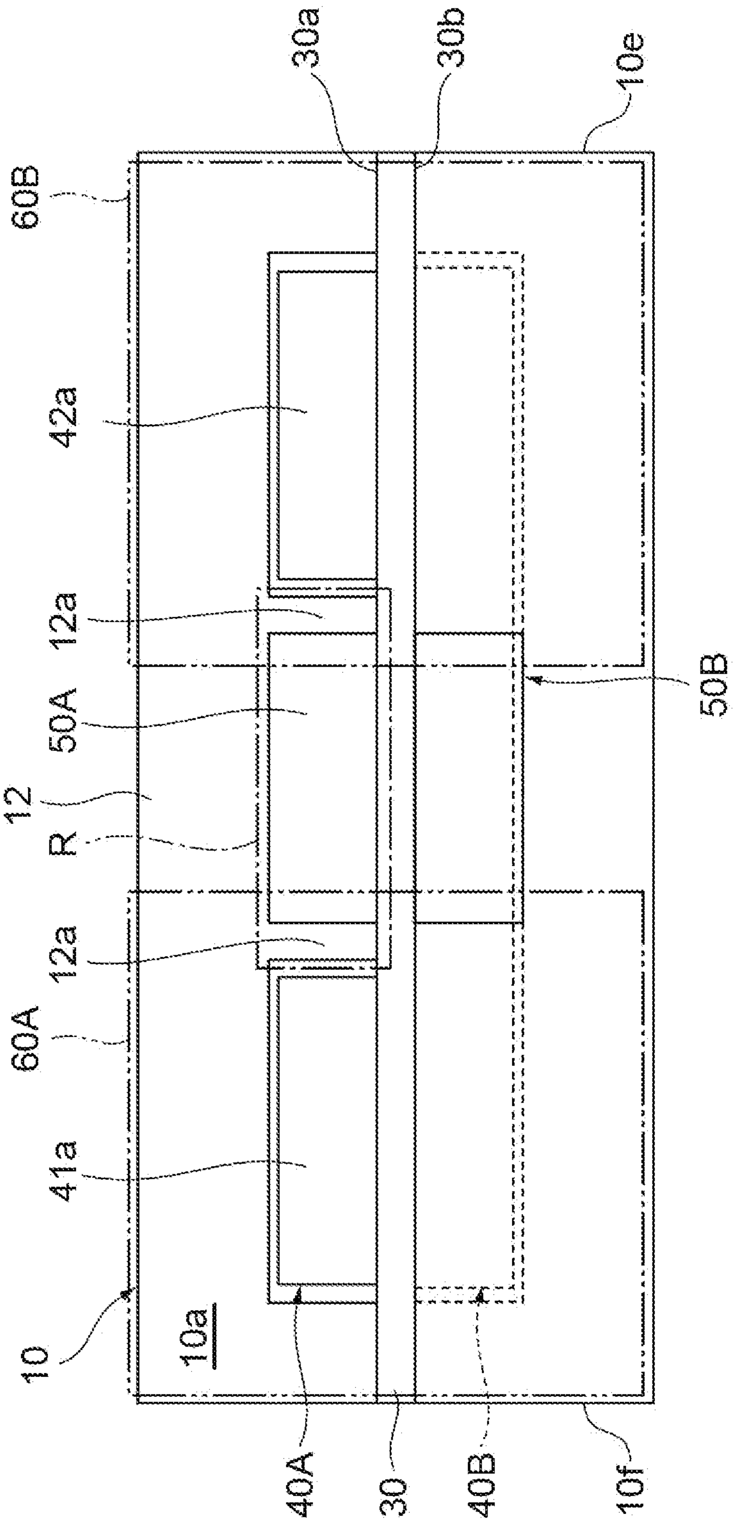
FIG. 9 shows an embodiment different from that shown in FIG. 7.

For example, as shown in FIG. 9, the metal magnetic powder-containing resin 12 of the element body 10 may be located in the region R. In the embodiment shown in FIG. 9, in the region R, a part 12*a* of the metallic magnetic powder-containing resin 12 is exposed from the inside of the element body 10, and the upper insulator 50A is sandwiched between the metallic magnetic powder-containing resin 12 in the direction in which the outer end portions 41*a* and 42*a* are arranged (the left-right direction in FIG. 9). Also, in this case, the external terminal electrode 60A can directly cover a part of the upper insulator 50A exposed in the region R, and the external terminal electrode 60B can directly cover a part of the upper insulator 50A exposed in the region R.

Figure 10:
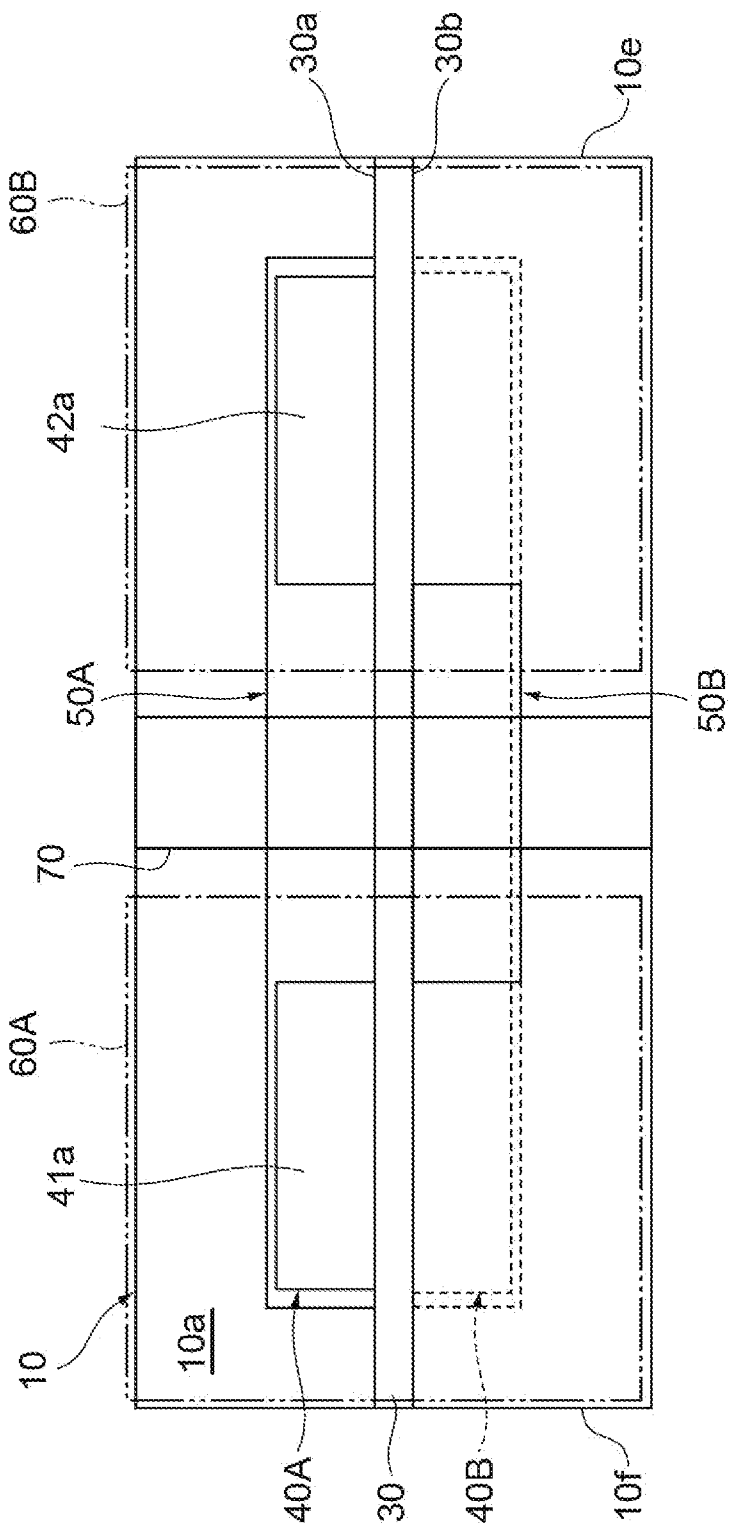
FIG. 10 shows an embodiment different from that shown in FIG. 7.

As shown in FIG. 10, an insulating layer 70 may be provided to cover the end face 10*a* exposed between the external terminal electrodes 60A and 60B. The insulating layer 70 extends so as to cross between the external terminal electrodes 60A and 60B on the end face 10*a* of the element body 10. The insulating layer 70 can be provided so as to cover at least a portion of the region R. The insulating layer 70 may be provided to cover the end surface 10*b* exposed between the external terminal electrodes 60C and 60D. The insulating layer 70 can be made of an epoxy-based resin.

What is claimed is:

1. A coil component comprising:

an element body made of a metal magnetic powder-containing resin and having a first end face and a second end face parallel to each other;

an insulating substrate provided in the element body, the insulating substrate extending orthogonal to the first end face and the second end face between the first end face and the second end face;

a pair of coil portions provided on the insulating substrate and each having a first end portion exposed to the first end face;

a pair of first external terminals provided on the first end face and connected to the first end portions of the pair of coil portions, respectively;

a first insulating portion exposed from the inside of the element body to the first end face, the first insulating portion located between the first end portions of the pair of coil portions on the first end face; and another pair of coil portions that has a shape symmetrically inverted, relative to a shape of the pair of coil portions, around axes parallel to the first end face of the element body;

wherein each of the other pair of coil portions has a second end portion exposed to the second end face, and further comprising:

a pair of second external terminals provided on the second end face and connected to second end portions of the other pair of coil portions, respectively;

a second insulating portion exposed from the inside of the element body to the second end face and located between the second end portions of the pair of coil portions on the second end face and wherein the pair of first external terminals directly covers a portion of the first insulating portion on the first end face.

2. The coil component according to claim 1, wherein the first insulating portion is provided in an entire region sandwiched between the first end portions of the pair of coil portions on the first end face.

3. The coil component according to claim 1, wherein the first insulating portion and the metal magnetic powder-containing resin are exposed in a region sandwiched between the first end portions of the pair of coil portions on the first end face, and wherein the first insulating portion is sandwiched between the metal magnetic powder-containing resins in a direction where the first end portions of the pair of coil portions are arranged.

4. The coil component according to claim 1, wherein the first insulating portion extends to cross between the first end portions of the pair of coil portions.

5. The coil component according to claim 1, further comprising an insulating layer covering at least a part of a region sandwiched between the first end portions of the pair of coil portions on the first end face.

* * * * *